(12) United States Patent
Kim et al.

(10) Patent No.: US 9,365,912 B2
(45) Date of Patent: Jun. 14, 2016

(54) METHOD FOR PRODUCING HIGH-PURITY MANGANESE SULFATE MONOHYDRATE AND HIGH-PURITY MANGANESE SULFATE MONOHYDRATE PRODUCED BY THE METHOD

(71) Applicant: INDUSTRY FOUNDATION OF CHONNAM NATIONAL UNIVERSITY, Gwangju (KR)

(72) Inventors: Myong Jun Kim, Gwangju (KR); Tam Tran, Gwangju (KR)

(73) Assignee: INDUSTRY FOUNDATION OF CHONNAM NATIONAL UNIVERSITY, Gwangju (KR)

( * ) Notice: Subject to any disclaimer, the term of this patent is extended or adjusted under 35 U.S.C. 154(b) by 0 days.

(21) Appl. No.: 14/398,111

(22) PCT Filed: Dec. 28, 2012

(86) PCT No.: PCT/KR2012/011715
§ 371 (c)(1),
(2) Date: Oct. 30, 2014

(87) PCT Pub. No.: WO2013/165071
PCT Pub. Date: Nov. 7, 2013

(65) Prior Publication Data
US 2015/0110692 A1    Apr. 23, 2015

(30) Foreign Application Priority Data
Apr. 30, 2012   (KR) .......................... 10-2012-0045423

(51) Int. Cl.
*C01G 1/10*        (2006.01)
*C01G 45/10*    (2006.01)
(Continued)

(52) U.S. Cl.
CPC ................ *C22B 47/00* (2013.01); *C01G 45/02* (2013.01); *C01G 45/10* (2013.01)

(58) Field of Classification Search
CPC .................................. C01G 1/10; C01G 45/10
See application file for complete search history.

(56) References Cited

U.S. PATENT DOCUMENTS 4,489,043 A * 12/1984 Bowerman ............. C01G 45/10
423/49

FOREIGN PATENT DOCUMENTS

| JP | 56-026725 A | 8/2010 |
|---|---|---|
| KR | 10-2010-0002046 A | 1/2010 |

(Continued)

OTHER PUBLICATIONS

International Search Report for PCT/KR2012/011715, Apr. 2013.
(Continued)

*Primary Examiner* — Timothy Vanoy
(74) *Attorney, Agent, or Firm* — The PL Law Group, PLLC

(57) ABSTRACT

A method for producing high-purity manganese sulfate monohydrate from a low-grade composition includes acquiring a primary leached manganese solution by adding sulfuric acid and a reductant to a low-grade manganese-containing composition and leaching manganese therefrom; acquiring a secondary leached manganese solution from which primary impurities have been eliminated by adding calcium hydroxide to the primary leached manganese solution; acquiring a tertiary leached manganese solution from which secondary impurities have been eliminated by adding sulfides to the secondary leached manganese solution; acquiring manganese oxide from precipitating manganese by using sodium hydroxide in the tertiary leached manganese solution so as to control the pH thereof; adding sulfuric acid to the manganese oxide and redissolving; and drying the redissolved manganese oxide and acquiring high-purity manganese sulfate monohydrate. Thus the present invention allows production of high-purity manganese sulfate monohydrate from a low-grade manganese-containing composition, for use as material for a secondary battery.

26 Claims, 5 Drawing Sheets

(51) Int. Cl.
*C22B 47/00* (2006.01)
*C01G 45/02* (2006.01)

(56) References Cited

FOREIGN PATENT DOCUMENTS

| KR | 10-0975317 | B1 | 8/2010 |
| WO | WO 2011/041956 | A1 | 4/2011 |
| WO | WO 2011/120273 | A1 | 10/2011 |

OTHER PUBLICATIONS

Office action from Korean Intellectual Property Office (KIPO) in a counterpart Korean patent application, 2013.

* cited by examiner

METHOD FOR PRODUCING HIGH-PURITY MANGANESE SULFATE MONOHYDRATE AND HIGH-PURITY MANGANESE SULFATE MONOHYDRATE PRODUCED BY THE METHOD

CROSS REFERENCE TO RELATED APPLICATIONS AND CLAIM OF PRIORITY

This patent application claims benefit under 35 U.S.C. 119(e), 120, 121, or 365(c), and is a National Stage entry from International Application No. PCT/KR2012/011715, filed 28 Dec. 2012, which claims priority to Korean Patent Application No. 10-2012-0045423, filed 30 Apr. 2012, entire contents of which are incorporated herein by reference.

TECHNICAL FIELD

The present invention relates to a method for producing high-purity manganese sulfate monohydrate from a low-grade manganese-containing substance.

BACKGROUND ART

With the wide spread of electronic appliances including laptop computers, cellular phones, etc., there has recently been a rapid increase in demand for secondary batteries. A secondary battery is composed of an anode, a cathode, an electrolyte, and a separation membrane. Manganese oxides are widely used as main materials for the cathode. Demand for secondary batteries is now rapidly increasing, with the consequent increase in materials necessary for the production of secondary batteries.

Manganese sulfate monohydrate ($MnSO_4.H_2O$) is one of main cathode active materials for secondary batteries.

However, almost all the amount of manganese sulfate monohydrate needed as an electrode material for secondary batteries is imported. In addition, it is difficult to discover patent documents to which reference is made with regard to the production of manganese sulfate monohydrate from low-purity manganese ores or manganese-containing dust.

SUMMARY

It is an object of the present invention to provide a method for producing high-purity manganese sulfate monohydrate from a low-purity manganese-containing substance.

In order to accomplish the object, an aspect of the present invention provides a method for producing high-purity manganese sulfate monohydrate ($MnSO_4.H_2O$), comprising: leaching manganese from a low-purity manganese-containing substance with sulfuric acid ($H_2SO_4$) and a reductant to give a first manganese leachate; obtaining a second manganese leachate by removing a first impurity from the first manganese leachate with calcium hydroxide ($Ca(OH)_2$); obtaining a third manganese leachate by removing a second impurity from the second manganese leachate with a sulfide; precipitating manganese as a manganese oxide by adjusting pH of the third manganese leachate with sodium hydroxide (NaOH); re-dissolving the manganese oxide with sulfuric acid; drying the re-dissolved manganese oxide to afford high-purity manganese sulfate monohydrate ($MnSO_4.H_2O$).

In the manganese leaching step, sulfuric acid may be added in an amount 0.5 to 3 times a mole content of manganese in the low-purity manganese-containing substance.

In the manganese leaching step, the reductant may include an oxalate ($C_2O_4^{2-}$)-containing reagent, coke or sulfurous acid ($SO_2$) gas, and may be added in an amount 0.1 to 2 times a mole content of manganese in the low-purity manganese-containing substance.

The oxalate-containing reagent may include oxalic acid ($H_2C_2O_4.2H_2O$) or sodium oxalate ($Na_2C_2O_4$).

The first impurity may include iron, and the second manganese leachate-obtaining step may further comprise adding potassium and an oxidant.

The calcium hydroxide ($Ca(OH)_2$) may be added in such an amount that the first manganese leachate has a pH of 2 to 3.

The method may further comprise heating the second manganese leachate to a temperature of 80 to 120° C. after the addition of calcium hydroxide.

The method may further comprise adjusting acidity of the first manganese leachate to a pH of 5 or higher with an additional amount of calcium hydroxide.

In the method, potassium may be added in an amount 0.5 to 3 times a mole content of iron.

In the method, potassium may include potassium sulfate ($K_2SO_4$), and the oxidant may include hydrogen peroxide ($H_2O_2$).

In the third manganese leachate-obtaining step, the sulfide may include at least one selected from among sodium sulfide ($Na_2S$), calcium sulfide (CaS) and hydrogen sulfide ($H_2S$) and may be added in an amount 2 to 5 times a total mole of the second impurity.

The third manganese leachate-obtaining step may further comprise discarding the second impurity as a sulfide slurry through solid-liquid separation.

The manganese precipitating step may further comprise diluting the third manganese leachate in water so that the third manganese leachate has a manganese content of 50 to 100 g/L, and the acidity of the third manganese leachate may be adjusted to a pH of 8 to 9 with sodium hydroxide (NaOH) to precipitate manganese in a non-oxidative atmosphere.

The manganese precipitating step may further comprise washing the manganese oxide with water of 70 to 100° C.

In the re-dissolving step, sulfuric acid may be added in an amount 0.1 to 3 times the mole content of manganese in the manganese oxide The re-dissolving step may further comprise adding the manganese oxide obtained in the manganese precipitating step to the re-dissolved manganese oxide in sulfuric acid to neutralize the re-dissolved manganese oxide to a pH of 5 to 6.

The the re-dissolving step may further comprise performing solid-liquid separation on the neutralized manganese oxide to give fourth manganese leachate.

The drying step may be carried out by vacuum vaporization to afford manganese sulfate monohydrate as a crystal.

In accordance with another aspect thereof, the present invention provides a method for producing high-purity manganese sulfate monohydrate, comprising: leaching manganese from a low-purity manganese-containing substance with hydrochloric acid and a reductant to give a first manganese leachate; obtaining a second manganese leachate by removing a first impurity from the first manganese leachate with potassium hydroxide; obtaining a third manganese leachate by removing a second impurity from the second manganese leachate with a sulfide; and adding potassium hydroxide to the third manganese leachate to precipitate manganese as a manganese oxide and adding sulfuric acid to the manganese oxide.

In the method, hydrochloric acid may be added in an amount 2 to 4 times the mole content of manganese in the low-purity manganese-containing substance, and the reductant may be added in an amount 0.5 to 2 times the mole content of manganese in the low-purity manganese-containing substance.

In the method, the reductant includes an oxalate ($C_2O_4^{2-}$)-containing reagent, coke or sulfurous acid ($SO_2$) gas.

In the second manganese leachate-obtaining step, the first impurity may include iron and potassium hydroxide may be s used as a 1 M solution to adjust acidity of the first manganese leachate to a pH of 5 or higher to remove the first impurity.

In the third manganese obtaining step, the sulfide includes sodium sulfide may include at least one selected from among sodium sulfide ($Na_2S$), calcium sulfide (CaS) and hydrogen sulfide ($H_2S$), and may be added in an amount 10 to 50 times a total mole of the second impurity to remove the second impurity.

In the method, potassium hydroxide may added in such an amount as to adjust acidity of the third manganese leachate to a pH of 7 to 9 to produce manganese sulfate monohydrate.

The method may further comprise adding sulfuric acid in an amount 0.5 to 1.5 times a mole content of manganese in the manganese oxide, adding an additional amount of the manganese oxide after the addition of sulfuric aid, and performing solid-liquid separation to give a fourth manganese leachate.

The method may further comprise vaporizing the fourth manganese leachate in a vacuum to afford manganese sulfate monohydrate.

In accordance with a further aspect thereof, the present invention provides a high-purity manganese sulfate monohydrate, produced using the method.

As described hitherto, the method of the present invention can produce manganese sulfate monohydrate with a purity of 99.9% from a low-purity manganese-containing substance. Also, the high-purity manganese sulfate monohydrate is provided.

DETAILED DESCRIPTION

Figure 1:
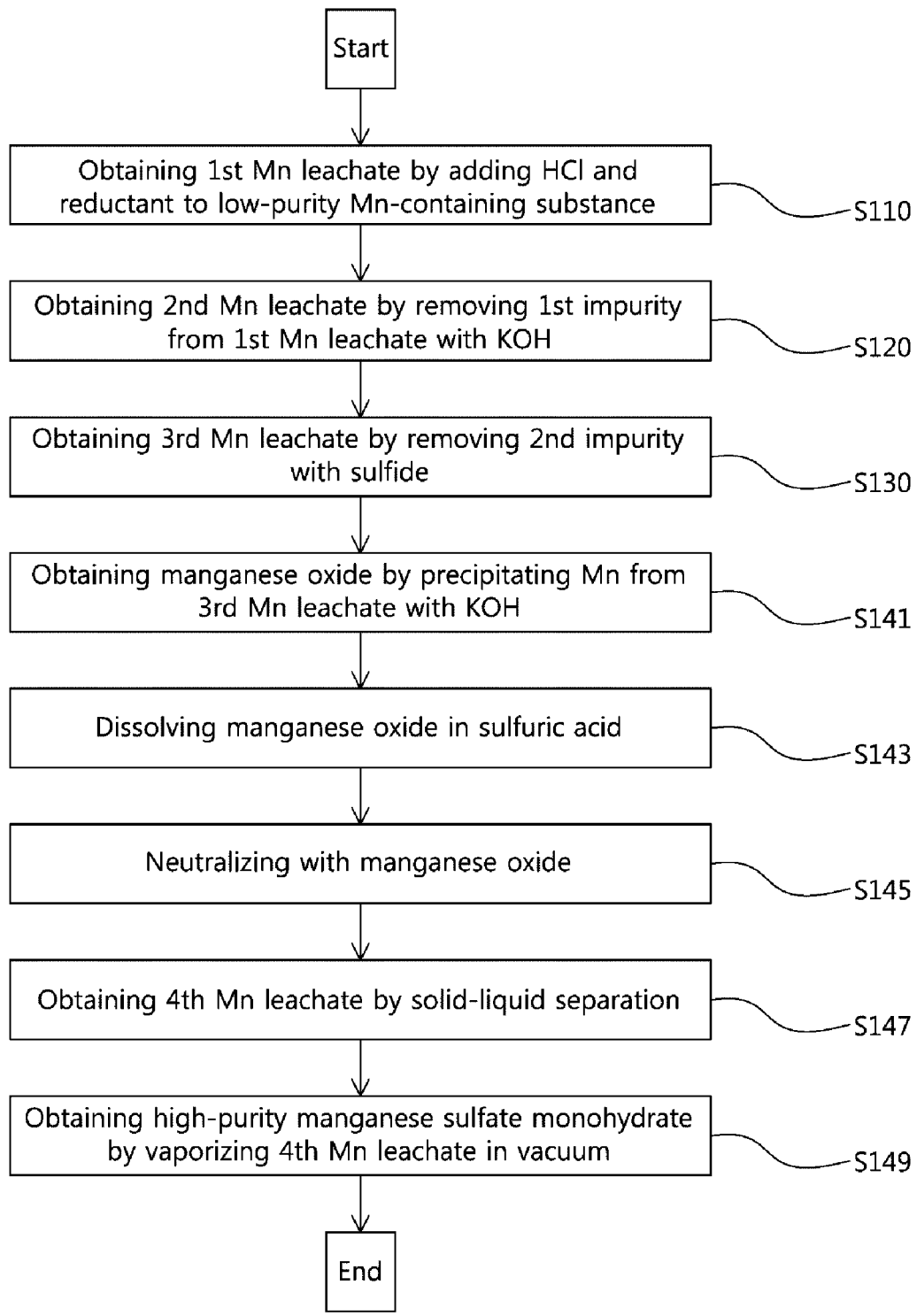
FIG. 1 is a schematic flow chart illustrating the production of high-purity manganese sulfate monohydrate according to one embodiment of the present invention.

Reference should now be made to the drawings, in which the same reference numerals are used throughout the different drawings to designate the same or similar components.

A production method of high-purity manganese sulfate monohydrate according to one embodiment of the present invention is explained in detail with reference to FIGS. 1 and 2. FIG. 1 is a schematic flow chart illustrating the production of high-purity manganese sulfate monohydrate according to one embodiment of the present invention, and FIG. 2 is a detail of the flow chart of FIG. 1.

Figure 2:
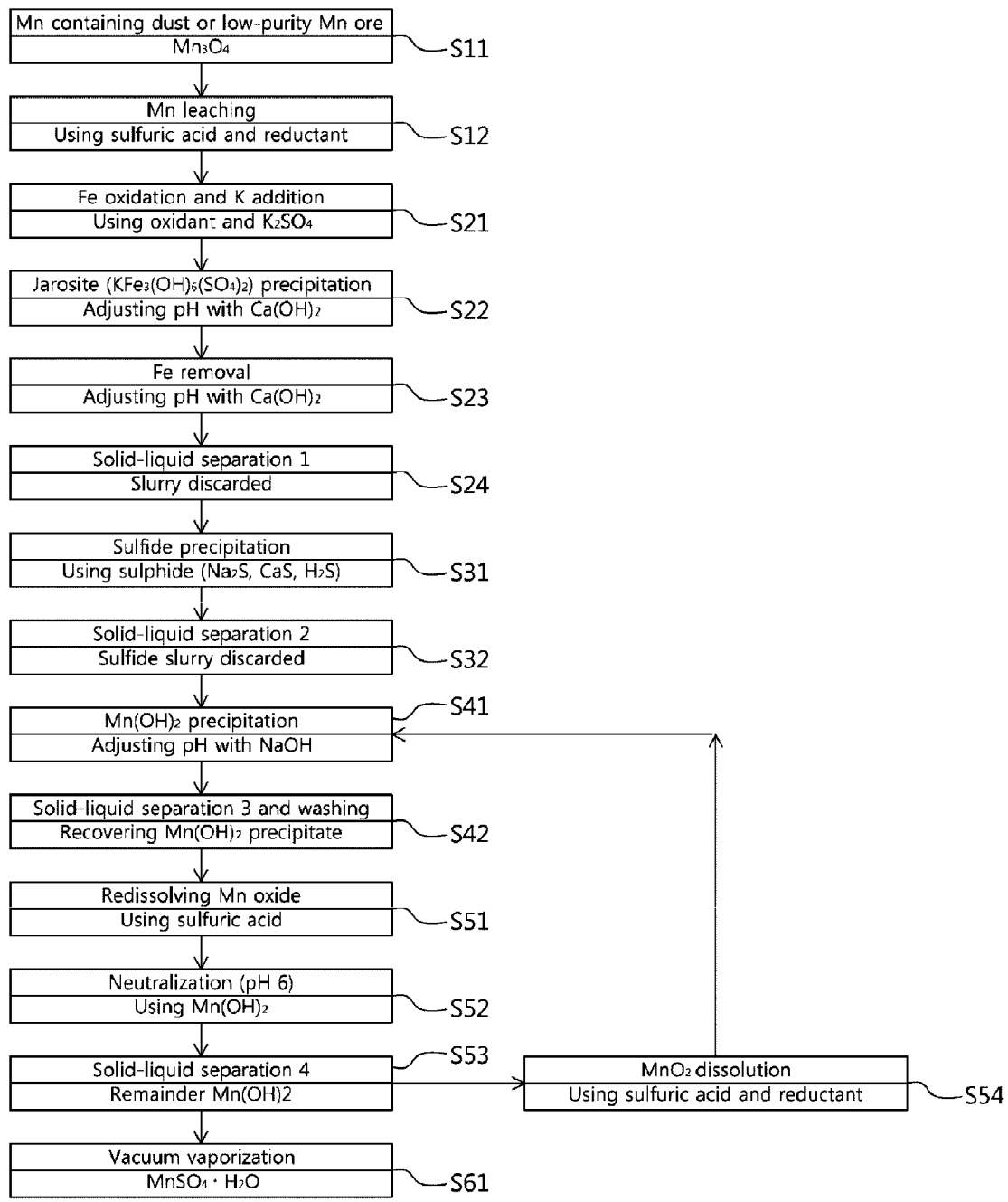
FIG. 2 is a detail of the flow chart of FIG. 1.

As shown in FIGS. 1 and 2, the method for producing high-purity manganese sulfate monohydrate in accordance with an embodiment of the present invention starts with adding sulfuric acid and a reductant to a low-purity manganese-containing substance to leach manganese (S10). The low-purity manganese-containing substance may include a low-purity manganese ore or low-purity manganese-containing dust.

To begin with, a low-purity manganese ore or manganese dust is prepared (S11). Low-purity manganese compounds in the manganese-containing dust may include manganese oxides and manganese carbonate such as MnO, $MnCO_3$, $Mn_2O_3$, $Mn_3O_4$, $MnO_2$, etc. The manganese compounds in manganese-containing dust show a manganese content of about 60 to 75%, but the manganese compounds themselves are of no significance as a commercial product because impurities coexist. The manganese-containing dust contains impurities such as iron (Fe), nickel (Ni), lead (Pb), zinc (Zn), cobalt (Co), copper (Cu), potassium (K), magnesium (Mg), calcium (Ca), sodium (Na), aluminum (Al), sulfur (S), phosphorus (P), silicon (Si), etc.

To the manganese-containing dust prepared in step S11, sulfuric acid and a reductant are added (S12).

In this regard, sulfuric acid ($H_2SO_4$) may be used in an amount 0.5 to 3 times the mole content of manganese in the manganese-containing dust, preferably in an amount 1 to 2 times the mole content of manganese in the manganese-containing dust, and more preferably in an amount 1 to 1.5 times the mole content of manganese in the manganese-containing dust.

The reductant may be used in an amount 0.1 to 2 times the mole content of manganese, preferably in an amount 0.5 to 1.5 times the mole content of manganese, and more preferably in an amount 0.5 to 1 times the mole content of manganese. The reductant may include an oxalate ($C_2O_4^{2-}$)-containing reagent, coke, or sulfurous acid ($SO_2$) gas. For use as a reductant in the present invention, the oxalate ($C_2O_4^{2-}$)-containing reagent may be dissolved in a predetermined amount in water before addition whereas sulfurous acid gas may be directly added.

Examples of the oxalate ($C_2O_4^{2-}$)-containing reagent include oxalic acid ($H_2C_2O_4 \cdot 2H_2O$) and sodium oxalate ($Na_2O_2O_4$).

When sulfuric acid and a reductant are added in the amounts defined above to manganese-containing dust, reactions occur as illustrated by the following Reaction Formulas. By the action of sulfuric acid and the reductant, manganese in the manganese-containing dust is leached in the form of manganese sulfate to give a first manganese leachate.

$MnO+H_2SO_4=MnSO_4+H_2O$      [Reaction Formula 1]

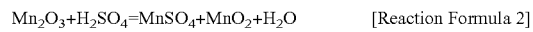
$Mn_2O_3+H_2SO_4=MnSO_4+MnO_2+H_2O$      [Reaction Formula 2]

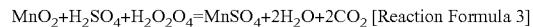
$MnO_2+H_2SO_4+H_2O_2O_4=MnSO_4+2H_2O+2CO_2$ [Reaction Formula 3]

$Mn_3O_4+3H_2SO_4+H_2C_2O_4=3MnSO_4+4H_2O+2CO_2$ [Reaction Formula 4]

Also, the production method according to this embodiment of the present invention comprises adding calcium hydroxide ($Ca(OH)_2$) to the first manganese leachate obtained in step S12 to yield a second manganese leachate free of a first impurity (S20).

In step S12, manganese is leached in the form of manganese sulfate from the manganese-containing dust by sulfuric acid and the reductant to give a first manganese leachate. This first manganese leachate contains a first impurity that must be removed. In this step, the first impurity includes iron.

Step S20 may further comprise adding potassium (K) and an oxidant to the first manganese leachate obtained in step S12 (S21). Thus, step S21 is configured to precipitate iron by using an oxidant to precipitate the iron of the first manganese leachate of step S12 in the form of K-jarosite ($KFe_3(SO_4)_2$ (OH)$_6$) through oxidation, and potassium (K), necessary for the formation of K-jarosite, to promote calcium hydroxide-induced iron precipitation. Potassium (K) may be added in an amount 0.5 to 3 times, preferably in an amount 0.5 to 2.5 times, and more preferably in an amount of 1 to 2 times the mole content of iron in the first manganese leachate. Examples of potassium may include potassium sulfate (K$_2$SO$_4$).

The oxidant may be added in an amount 0.5 to 3 times, preferably in an amount 0.5 to 2 times, and more preferably in an amount 1 to 1.5 times the mole content of iron in the first manganese leachate. Examples of the oxidant may include hydrogen peroxide (H$_2$O$_2$).

Following the addition of potassium and the oxidant, calcium hydroxide (Ca(OH)$_2$) is added (S22). In this regard, calcium hydroxide (Ca(OH)$_2$) may be a solution with a concentration of 10~20% or may be used in such an amount as to adjust the acidity of the iron-containing first manganese leachate into a pH of 2 to 3, preferably a pH of 2.2 to 2.7, and more preferably a pH of 2.3 to 2.6. After the addition of calcium hydroxide, the reaction mixture is heated to a temperature of 80 to 120° C., preferably a temperature of 85 to 110° C., and more preferably a temperature of 90 to 95° C., and subjected to a reaction for 2 to 4 hrs, preferably for 2.5 to 3.5 hrs, and more preferably for about 3 hrs. The reaction is conducted as follows.

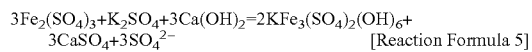

[Reaction Formula 5]

Hence, after the addition of potassium and an oxidant to the first manganese leachate obtained in step S12, calcium hydroxide can precipitate iron in a K-jarosite form from the manganese leachate.

In step S22, the temperature of the reaction mixture must be raised only after the pH of the reaction mixture is adjusted with calcium hydroxide. If an increase in temperature is followed by the addition of calcium hydroxide to conduct the reaction of Reaction Formula 5, reactivity sharply increases to cause iron to precipitate in the form of a hydroxide such as Fe(OH)$_3$ or FeOOH, rather than K-jarosite, to which solid-liquid separation is difficult.

In accordance with one embodiment of the present invention, the step S20 may further comprise adding calcium hydroxide (Ca(OH)$_2$) to adjust acidity of the first manganese leachate to a pH of 5 or higher (S23). In order to remove the remainder iron that has not been precipitated as K-jarosite from the first manganese leachate, a concentrated (10~20%) Ca(OH)$_2$ solution may be added such that the acidity of the first manganese leachate is adjusted to a pH of 5 or higher, preferably a pH of 5 to 6, and more preferably a pH of 5 to 5.5. At this adjusted pH, remainder iron may be removed as Fe(OH)$_3$ or FeOOH. In step S23, the remainder iron of the manganese leachate may be removed as the reaction proceeds according to Reaction Formula 6.

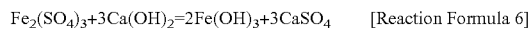   [Reaction Formula 6]

The step S20 may further comprise performing first solid-liquid separation after the removal of iron through the reaction of Reaction Formula 6 (S24). A slurry to which iron is precipitated is wasted by solid-liquid separation to recover an iron-free second manganese leachate. However, the iron-free, second manganese leachate further contains a second impurity such as nickel (Ni), lead (Pb), zinc (Zn), cobalt (Co), copper (Cu).

Hence, the production method according to an embodiment of the present invention comprises adding a sulfide to the second manganese leachate to obtain a third manganese leachate free of the second impurity (S30). Since the second manganese leachate, although free of iron, contains a second impurity such as nickel (Ni), lead (Pb), zinc (Zn), cobalt (Co), copper (Cu), etc., the second impurity can be removed as sulfide precipitate when a sulfide is added thereto.

Therefore, a sulfide is added to the second manganese leachate (S31). The sulfide may include at least one selected from among sodium sulfide (Na$_2$S), calcium sulfide (CaS) and hydrogen sulfide (H$_2$S), and may be used in an amount 1.5 to 5 times, preferably in an amount 1.5 to 3 times, and more preferably in an amount 2 times the total mole of the remainder impurity. The pH of the sulfide added may be adjusted to 7 to 8, and preferably 8. By the reaction, the impurity nickel (Ni), lead (Pb), zinc (Zn), cobalt (Co) or copper (Cu) other than iron can be precipitate as a sulfide (NiS, PbS, ZnS, CoS, CuS).

The step S30 may further comprise performing second solid-liquid separation after sulfide reaction (S32). Through the second solid-liquid separation, a slurry of sulfide precipitates is discarded while third manganese leachate free of the second impurity can be recovered.

As described above, the manganese leachate free of the first impurity iron and the second impurities nickel, lead, zinc, cobalt, and copper that can be precipitated as a sulfide contains other impurities and manganese therein. It is thus necessary to selectively dissolve manganese only.

Accordingly, the production method of the present invention comprises adjusting pH of the third manganese leachate with sodium hydroxide (NaOH) in a non-oxidative atmosphere to precipitate manganese as manganese oxides (S40). Since the third manganese leachate obtained in step S32 has a high manganese concentration equal or higher than about 100 g/L or higher, manganese can be precipitated together with impurities such as magnesium, calcium, etc. In order to precipitate manganese, accordingly, the manganese precipitation step may further comprise diluting the third manganese leachate with water to a manganese content of 50 to 80 g/L in the third manganese leachate, and sodium hydroxide (NaOH) is used such that the third manganese leachate has a pH of 8 to 9 to precipitate manganese (S41).

At step S41, the dilution may achieved by adding water to the degree that the third manganese leachate has a manganese content of 50 to 80 g/L, preferably 55 to 75 g/L, and more preferably 60 to 70 g/L. For selective precipitation of manganese, sodium hydroxide may be used at a temperature of 40 to 90° C., preferably 50 to 80° C., more preferably 60 to 70° C., and far more preferably 65° C. in such an amount that the diluted manganese leachate has a pH of 7 to 9, preferably a pH of 8 to 9, more preferably a pH of 8 to 8.5, and far more preferably a pH of 8 to 8.2. In this regard, when the pH of the diluted manganese leachate is lower than the lower limit, the recovery of manganese may be poor. On the other hand, a higher pH than the upper limit may cause the precipitation of impurities, resulting in decreasing the purity of the final product. In this step, manganese is recovered as a precipitate of (Mn(OH)$_2$), with a recovery rate of 95% or higher.

This manganese precipitation step comprises performing third solid-liquid separation to recover manganese as a precipitate of manganese oxide and washing the manganese oxides of recovered Mn(OH)$_2$ (S42).

Manganese oxides of the recovered Mn(OH)$_2$ may be washed at least once with water of 60 to 80° C., preferably with water of 60 to 70° C., and more preferably with water of 65° C. This washing step may be preferably conducted three times using water through which remaining impurities magnesium, calcium, potassium and sodium other than manganese can be removed.

Also, the production method of the present invention comprises re-dissolving the washed manganese oxide with sulfuric acid (S50).

Sulfuric acid is added to the manganese oxide washed in step S42 to re-dissolve the manganese oxide (S51). Sulfuric acid may be used in an amount 0.5 to 3 times the mole content of manganese in the manganese oxide, preferably in an amount 1 to 2 times, and more preferably in an amount 1 to 1.5 times. The re-dissolution of manganese oxides in sulfuric acid proceeds according to the following reaction formulas:

$$MnO + H_2SO_4 = MnSO_4 + H_2O \quad \text{[Reaction Formula 7]}$$

$$Mn_2O_3 + H_2SO_4 = MnSO_4 + MnO_2 + H_2O \quad \text{[Reaction Formula 8]}$$

The re-dissolved solution in sulfuric acid of step S51 is subjected to neutralization (S52). As a reagent for this neutralization, the manganese oxides obtained in step S42 may be available. Thus, the manganese oxides obtained in step S42 may be added to adjust the acidity of the re-dissolved solution of sulfuric acid in step S51 into a pH of 5 to 6.

After the neutralization of step S52, the method further comprises performing fourth solid-liquid separation (S53). A fourth manganese leachate recovered by the fourth solid-liquid separation is directed toward the following step S61 while the remainder after the fourth solid-liquid separation is subjected to step S54.

The fourth manganese leachate recovered through the fourth solid-liquid separation in step S53 is dried to afford high-purity manganese sulfate monohydrate (S60). This drying may be carried out by vacuum vaporization to produce manganese sulfate monohydrate as a crystal (S61). Only after the drying of step S61, manganese sulfate monohydrate is produced with a high purity.

The remainder after the fourth solid-liquid separation of step S53 can be recycled in step S54. Manganese oxides in the remainder are leached with sulfuric acid and a reductant to give manganese sulfate. This manganese leachate is proceeded to step S41 where manganese is selectively precipitated. The step S54 of adding sulfuric acid and a reductant is carried out in the same manner as in step S12.

Also, the present invention addresses the high-purity manganese sulfate monohydrate ($MnSO_4 \cdot H_2O$) produced by the production method described above.

Figure 3:
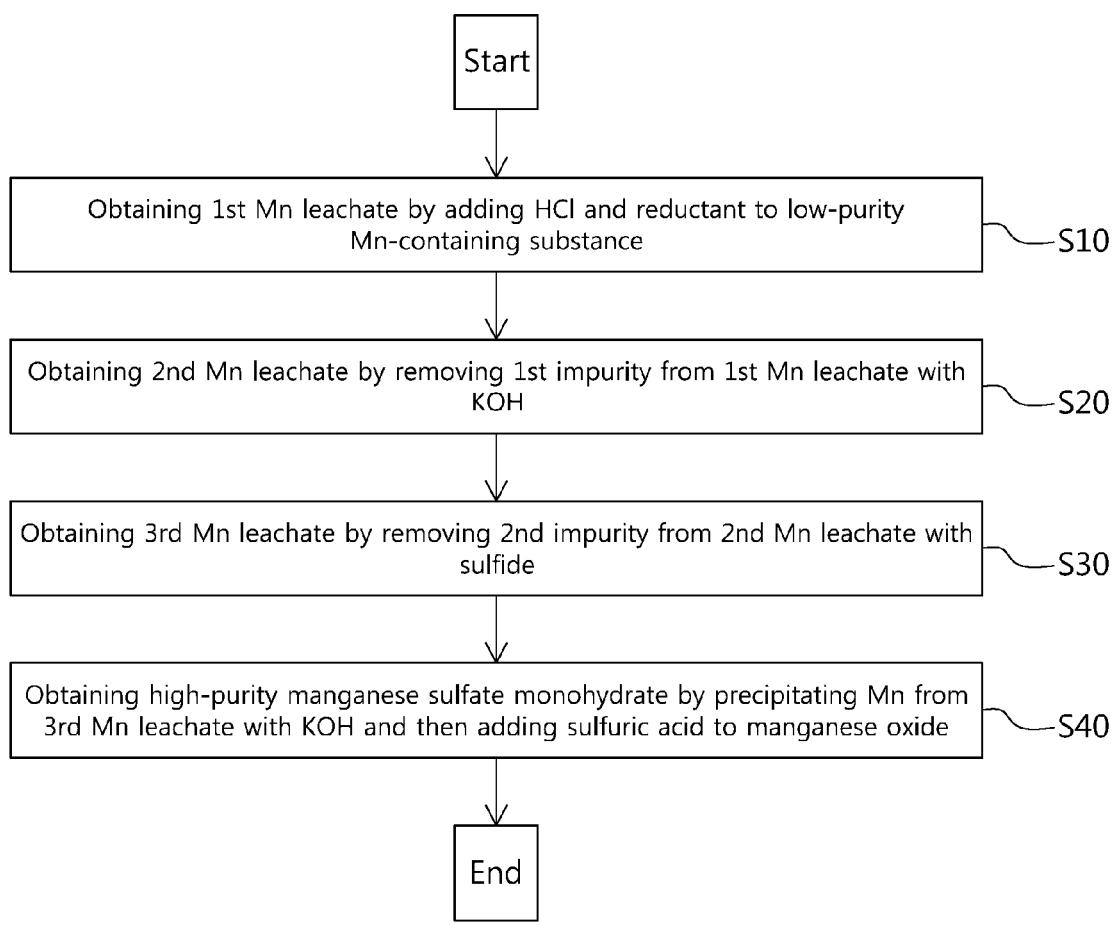
FIG. 3 is a schematic flow chart illustrating the production of high-purity manganese sulfate monohydrate according to another embodiment of the present invention.
Figure 4:
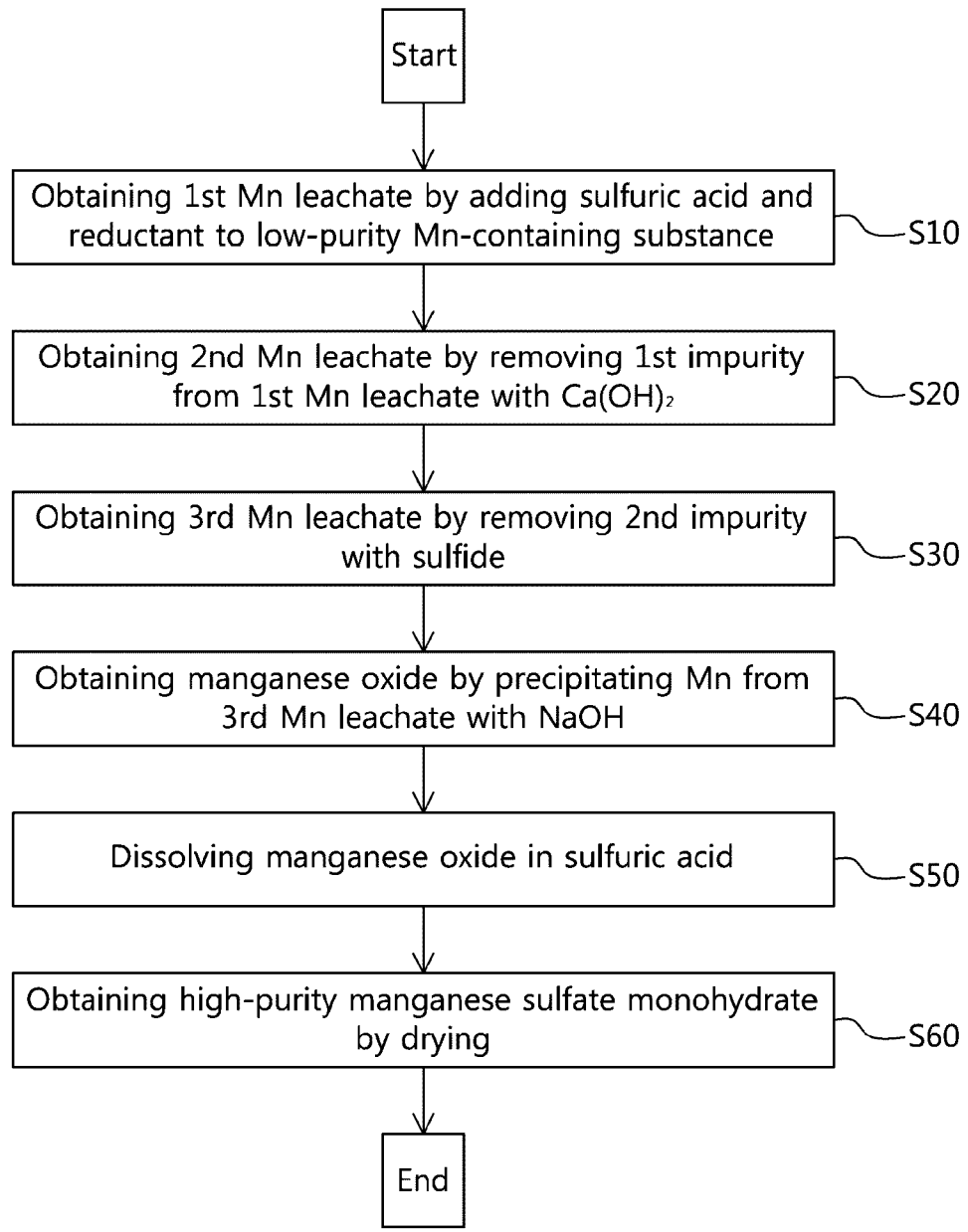
FIG. 4 is a detail of the flow chart of FIG. 3.

With reference to FIGS. 3 and 4, there are flow charts illustrating a method for producing high-purity manganese sulfate monohydrate in accordance with another embodiment of the present invention.

As shown in FIG. 3, the method comprises adding hydrochloric acid and a reductant to a low-purity manganese-containing substance to give a first manganese leachate (S110), removing a first impurity from the first manganese leachate with potassium hydroxide to give a second manganese leachate (S120), removing a second impurity from the second manganese leachate with a sulfide to give a third manganese leachate (S140), and reacting the third manganese leachate with potassium hydroxide to precipitate manganese in the form of manganese oxides, followed by adding sulfuric acid to the precipitate to yield high-purity manganese sulfate monohydrate (S140). Details of the production method of high-purity manganese sulfate monohydrate are illustrated referring to FIG. 4.

As illustrated in FIG. 4, hydrochloric acid and a reductant are added to a low-purity manganese-containing substance to give a first manganese leachate (S110).

The low-purity manganese-containing substance may include a low-purity manganese ore or low-purity manganese-containing dust.

Hydrochloric acid may be used as an aqueous solution in an amount 2 to 4 times the mole content of manganese in the low-purity manganese-containing substance, and preferably in an amount 2 to 5 times the mole content of manganese in the low-purity manganese-containing substance. The reductant may include an oxalate ($C_2O_4^{2-}$)-containing reagent, coke, or sulfurous acid ($SO_2$) gas. Examples of the oxalate ($C_2O_4^{2-}$)-containing reagent include oxalic acid ($H_2C_2O_4 \cdot 2H_2O$) and sodium oxalate ($Na_2C_2O_4$).

For use as a reductant, oxalic acid ($H_2C_2O_4 \cdot 2H_2O$) is dissolved in water in an amount 0.5 to 2 times the mole content of manganese in the low-purity manganese-containing substance, and added to the low-purity manganese-containing substance. The addition of hydrochloric acid and the reductant leaches the manganese contained in the low-purity manganese-containing substance into manganese chloride as illustrated by the following Chemical Formula 9.

When coke or sulfurous acid gas is used as a reductant, the low-purity manganese-containing substance is reduced through calcination using coke or sulfurous acid gas before hydrochloric acid is added to leach the manganese contained in the low-purity manganese-containing substance into manganese chloride. The reduction of coke is carried out according to the following Reaction Formula 10:

$$MnO + 2HCl = MnCl_2 + 2H^+$$

$$Mn_2O_3 + 2HCl = MnCl_2 + MnO_2 + H_2O$$

$$MnO_2 + 2HCl + H_2C_2O_4 = MnCl_2 + 2H_2O + 2CO_2$$

$$Mn_3O_4 + 6HCl + H_2C_2O_4 = 3MnCl_2 + 4H_2O + 2CO_2 \quad \text{[Reaction Formula 9]}$$

$$Mn_2O_3 + C = CO + 2MnO$$

$$CO + \tfrac{1}{2}O_2 = CO_2 \quad \text{[Reaction Formula 10]}$$

From the first manganese leachate, a first impurity is removed using potassium hydroxide to give a second manganese leachate (S120). The first impurity includes iron (Fe).

For removing iron, potassium hydroxide is used in an amount such that the first manganese leachate has a pH of 5 or higher or preferably a pH of 5 to 5.5. Iron is removed in the form of $Fe(OH)_3$ or FeOOH as illustrated by the following Chemical Formula 11:

$$FeCl_2 + 2KOH = Fe(OH)_2 + 2KCl$$

$$FeCl_3 + 3KOH = Fe(OH)_3 + 3KCl \quad \text{[Reaction Formula 11]}$$

Once iron is precipitated by potassium hydroxide, the slurry is discarded by solid-liquid separation to obtain an iron-depleted, second manganese leachate.

A sulfide is added to the second manganese leachate to remove a second impurity therefrom, giving a third manganese leachate (S130).

Examples of the second impurity include nickel (Ni), lead (Pb), zinc (Zn), cobalt (Co), and copper (Cu), and these impurities can be removed as sulfide precipitates when a sulfide is added.

The sulfide may include at least one selected from among sodium sulfide ($Na_2S$), calcium sulfide (CaS) and hydrogen sulfide ($H_2S$), and may be used as an aqueous solution in an amount 2 to 5 times the total mole of the second impurity.

Once the second impurity is precipitated as a sulfide, the sulfide slurry is discarded by solid-liquid separation to obtain a third manganese leachate free of the second impurity.

Step S140 of FIG. 3 comprises the following steps S141 to S149. The third manganese leachate is reacted with potassium hydroxide to precipitate manganese in the form of manganese oxides (S141).

Since the third manganese leachate dissolves manganese, magnesium, calcium, and potassium therein, it is necessary to selectively precipitate manganese only. To this end, at least 1 M potassium hydroxide solution is added at 60 to 70° C. in a non-oxidative atmosphere in such an amount that the third manganese leachate has a pH of 7 to 9, with the consequent precipitation of manganese. When the pH of the manganese leachate is lower than the lower limit, the recovery of manganese (Mn) may be poor. On the other hand, a higher pH than the upper limit may cause the precipitation of impurities, resulting in decreasing the purity of the final product.

The manganese precipitate may be in the form of manganese oxides such as $Mn(OH)_2$.

To obtain the manganese oxide precipitate, solid-liquid separation is conducted, followed by washing. This washing uses water at 60 to 90° C. in a non-oxidative atmosphere. Through this washing, other impurities are removed from the manganese oxide precipitate, as well.

The washed manganese oxide is dissolved in sulfuric acid (S143).

For this, sulfuric acid is added in an amount 0.5 to 1.5 times the mole content of manganese in the manganese oxide to incur the reaction illustrated in the following Chemical Formula 4:

$$MnO+H_2SO_4=MnSO_4+H_2O$$

$$Mn_2O_3+H_2SO_4=MnSO_4+MnO_2+H_2O \quad \text{[Reaction Formula 12]}$$

The sulfuric acid solution is neutralized with the manganese oxide obtained in step S141 (S145). For this neutralization, the manganese oxide is added to adjust the acidity of the sulfuric acid solution to a pH of 4 to 6.

Solid-liquid separation is performed on the neutralized solution to give a fourth manganese leachate (S147).

The fourth manganese leachate is vaporized in a vacuum to dryness to afford high-purity manganese sulfate monohydrate as a crystal (S149).

Conditions for the vacuum vaporization are set to have a saturated vapor pressure of 0.57~0.7 kgf/cm², and preferably a saturated vapor pressure of 0.6~0.65 kgf/cm² and a temperature of 85 to 90° C. At a temperature less than the lower limit, the vaporization point is lowered below 80° C., which may lead to producing manganese sulfate pentahydrate ($MnSO_4.5H_2O$) rather than manganese sulfate monohydrate ($MnSO_4.H_2O$). At a temperature higher than the upper limit, the energy efficiency is decreased, and thus an economical disadvantage results.

In accordance with the present invention, manganese sulfate monohydrate can be produced with a purity of 99.9% from low-purity manganese-containing substance.

A better understanding of the present invention may be obtained through the following examples which are set forth to illustrate, but are not to be construed as limiting the present invention.

EXAMPLE 1

Production of High-Purity Manganese Sulfate Monohydrate

Manganese-containing dust weighing 3 kg was prepared. The composition of manganese-containing dust was as shown in Table 1, below.

TABLE 1

| Compound | Conc. (%) |
|---|---|
| Mn | 72.8 |
| K | 0.27 |
| Fe | 2.82 |
| Mg | 0.15 |
| Ca | 0.22 |
| Na | 0.07 |
| Zn | 0.11 |
| Pb | 0.05 |
| Si | 0.19 |
| P | 0.03 |
| Al | 0.11 |
| S | 0.04 |
| Co | 0.00 |
| Total | 76.8 |

A solution of 2.37 L of sulfuric acid ($H_2SO_4$) in 2.37 L of water and a solution of 1.15 kg of oxalic acid ($H_2C_2O_4.2H_2O$) in 3.5 L of water were added to the manganese-containing dust. Manganese in the manganese-containing dust was leached as manganese sulfate by the addition of sulfuric acid and the reductant.

Of the leachate, iron was precipitated as K-jarosite. For this, 150 mL of hydrogen peroxide ($H_2O_2$) as an oxidant and 77 g of potassium sulfate ($K_2SO_4$) were dissolved in 0.65 L of water and added to the leachate. The pH of the leachate was adjusted to 2 to 3 with 4 L of a conc. (10~20%) solution of $Ca(OH)_2$. A reaction was carried out at 95° C. As a result, iron was precipitated in the form of K-jarosite.

To further remove the iron that might remain even after the reaction, the pH of the leachate was adjusted to 5.5 with 1 L of a conc. solution (10~20%) of $Ca(OH)_2$.

After iron precipitated, the slurry was discarded by first solid-liquid separation while the resulting iron-free manganese leachate was recovered.

To remove the impurities nickel, lead, zinc, cobalt and copper other than iron, a sulfide ($Na_2S$, $H_2S$) was added in an amount twice the mole content of the impurities.

In the presence of a sulfide, the impurities other than iron precipitated as sulfides. Then, the resulting sulfide slurry of the impurities was discarded by solid-liquid separation to obtain a manganese leachate free of the impurities.

In order for the manganese leachate to have a total manganese content of 60 to 80 g/L, 5 L of the manganese leachate was diluted with 3 L of water. Under a non-oxidative atmosphere, 8 to 9 L of a 10% sodium hydroxide solution was added to the dilution at 65° C. to adjust the acidity of the manganese leachate to a pH of 8 to 9, thereby precipitate manganese as a $Mn(OH)_2$ form.

The precipitate of manganese oxide in the form of $Mn(OH)_2$ was recovered by third solid-liquid separation, and then washed three times with water of 65° C. to remove other impurities such as sodium, etc.

4.5 kg of the washed manganese oxide was re-dissolved in a dilution of 1.05 L of sulfuric acid in 1.05 L of water. Thereafter, 300 mL of the washed, 50% manganese oxide was added to neutralize the re-dissolution to pH 4.

The neutralized, re-dissolution was subjected to fourth solid-liquid separation, and the manganese leachate thus obtained was crystallized into manganese sulfate monohydrate by vacuum vaporization at a saturated vapor pressure of 0.6 to 0.65 kgf/cm². At a saturated vapor pressure less than the lower limit, the vaporization point is lowered below 80° C., which may lead to producing manganese sulfate pentahydrate ($MnSO_4.5H_2O$) rather than manganese sulfate monohydrate ($MnSO_4.H_2O$). At a saturated vapor pressure higher than the upper limit, the energy efficiency is decreased, and thus an economical disadvantage results. The residue after the fourth solid-liquid separation may be re-dissolved with sulfuric acid and a reductant and may be proceeded to step S41 of FIG. 2 for recycling.

The manganese sulfate monohydrate was obtained as a crystal with a purity of 99.9%.

EXPERIMENTAL EXAMPLE 1

Analysis of Manganese Sulfate Monohydrate of Example 1

EXPERIMENTAL EXAMPLE 1-1

Ingredient Analysis of Manganese Sulfate Monohydrate

The manganese sulfate monohydrate prepared in Example 1 was analyzed for purity and ingredient. The results are summarized in Table 2, below.

TABLE 2

| | Analysis Item | SPEC | Example 1 |
|---|---|---|---|
| | Purity | ≥97.0% | ≥99.9% |
| Impurity (ppm) | Na | ≤300 | 54.24 |
| | Mg | ≤120 | 6.44 |
| | Ca | ≤100 | ND |
| | Fe | ≤5 | ND |
| | Zn | ≤5 | 1.63 |
| | Cu | ≤5 | ND |
| | Cr | ≤5 | ND |

In Table 2, the Spec column defines a standard specification required for the use of manganese sulfate monohydrate as a material of secondary batteries. As can be seen in Table 2, the manganese sulfate monohydrate prepared in Example 1 was found to exactly meet the standard specification. Accordingly, the manganese sulfate monohydrate produced by the method of the present invention was proven to be effective as a material for secondary batteries.

EXPERIMENTAL EXAMPLE 1-2

XRD Analysis of High-Purity Manganese Sulfate Monohydrate

To examine whether the high-purity manganese sulfate monohydrate produced in Example 1 is suitable for use in secondary batteries, X-ray diffraction (XRD) analysis was performed while a standard manganese sulfate monohydrate used in secondary batteries served as a control.

Figure 5:
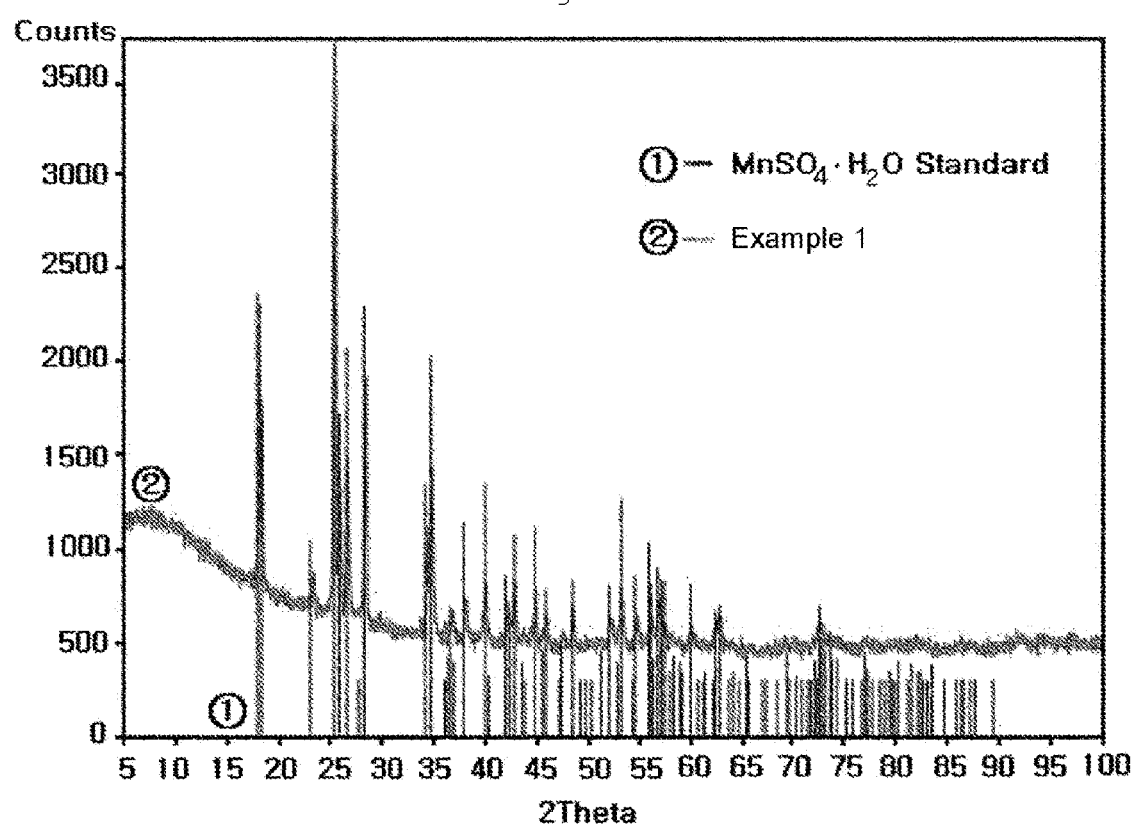
FIG. 5 shows an XRD pattern of the high-purity manganese sulfate monohydrate produced according to one embodiment of the present invention.

The results are depicted in FIG. 5. As can be seen in FIG. 5, X-ray peak patterns of the manganese sulfate monohydrate prepared in Example 1 in accordance with the present invention were found to nearly perfectly match with those of the standard manganese sulfate monohydrate. Accordingly, the manganese sulfate monohydrate prepared according to the method of the present invention was proven effectively usable as a material for secondary batteries.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

As described hitherto, the manganese sulfate monohydrate produced using the method of the present invention can be useful as a material of secondary batteries, thus demonstrating its industrial applicability.

The invention claimed is:

1. A method for producing high-purity manganese sulfate monohydrate ($MnSO_4 \cdot H_2O$), comprising:
   leaching manganese from a low-purity manganese-containing substance with sulfuric acid ($H_2SO_4$) and a reductant to give a first manganese leachate;
   obtaining a second manganese leachate by removing a first impurity from the first manganese leachate with calcium hydroxide ($Ca(OH)_2$);
   obtaining a third manganese leachate by removing a second impurity from the second manganese leachate with a sulfide;
   precipitating manganese as a manganese oxide by adjusting pH of the third manganese leachate with sodium hydroxide (NaOH);
   re-dissolving the manganese oxide with sulfuric acid;
   drying the re-dissolved manganese oxide to afford high-purity manganese sulfate monohydrate ($MnSO_4 \cdot H_2O$).

2. The method of claim 1, wherein sulfuric acid is added in an amount 0.5 to 3 times a mole content of manganese in the low-purity manganese-containing substance in the manganese leaching step.

3. The method of claim 2, wherein the reductant of the manganese leaching step includes an oxalate ($C_2O_4^{2-}$)-containing reagent, coke or sulfurous acid ($SO_2$) gas, and is added in an amount 0.1 to 2 times a mole content of manganese in the low-purity manganese-containing substance.

4. The method of claim 3, wherein the oxalate-containing reagent includes oxalic acid ($H_2C_2O_4 \cdot 2H_2O$) or sodium oxalate ($Na_2C_2O_4$).

5. The method of claim 4, wherein the first impurity includes iron, and the second manganese leachate-obtaining step further comprises adding potassium and an oxidant.

6. The method of claim 5, wherein the calcium hydroxide ($Ca(OH)_2$) is added in such an amount that the first manganese leachate has a pH of 2 to 3.

7. The method of claim 6, further comprising heating the second manganese leachate to a temperature of 80 to 120° C. after the addition of calcium hydroxide.

8. The method of claim 7, further comprising adjusting acidity of the first manganese leachate to a pH of 5 or higher with an additional amount of calcium hydroxide.

9. The method of claim 8, wherein potassium is added in an amount 0.5 to 3 times a mole content of iron.

10. The method of claim 9, wherein potassium includes potassium sulfate ($K_2SO_4$), and the oxidant includes hydrogen peroxide ($H_2O_2$).

11. The method of claim 10, wherein the sulfide includes at least one selected from among sodium sulfide ($Na_2S$), calcium sulfide (CaS) and hydrogen sulfide ($H_2S$) and is added in an amount 2 to 5 times a total mole of the second impurity in the third manganese leachate-obtaining step.

12. The method of claim 11, wherein the third manganese leachate-obtaining step further comprises discarding the second impurity as a sulfide slurry through solid-liquid separation.

13. The method of claim 12, wherein the manganese precipitating step further comprises diluting the third manganese leachate in water so that the third manganese leachate has a manganese content of 50 to 100 g/L, and the acidity of the third manganese leachate is adjusted to a pH of 8 to 9 with sodium hydroxide (NaOH) to precipitate manganese in a non-oxidative atmosphere.

14. The method of claim 13, wherein the manganese precipitating step further comprises washing the manganese oxide with water of 70 to 100° C.

15. The method of claim 14, wherein sulfuric acid is added in an amount 0.1 to 3 times a mole content of manganese in the manganese oxide in the re-dissolving step.

16. The method of claim 15, wherein the re-dissolving step further comprises adding the manganese oxide obtained in the manganese precipitating step to the re-dissolved manganese oxide in sulfuric acid to neutralize the re-dissolved manganese oxide to a pH of 5 to 6.

17. The method of claim 16, wherein the re-dissolving step further comprises performing solid-liquid separation on the neutralized manganese oxide to give fourth manganese leachate.

18. The method of claim 17, wherein the drying step is carried out by vacuum vaporization to afford manganese sulfate monohydrate as a crystal.

19. A method for producing high-purity manganese sulfate monohydrate, comprising:
   leaching manganese from a low-purity manganese-containing substance with hydrochloric acid and a reductant to give a first manganese leachate;
   obtaining a second manganese leachate by removing a first impurity from the first manganese leachate with potassium hydroxide;
   obtaining a third manganese leachate by removing a second impurity from the second manganese leachate with a sulfide; and
   adding potassium hydroxide to the third manganese leachate to precipitate manganese as a manganese oxide and adding sulfuric acid to the manganese oxide.

20. The method of claim 19, wherein hydrochloric acid is added in an amount 2 to 4 times a mole content of manganese in the low-purity manganese-containing substance, and the reductant is added in an amount 0.5 to 2 times a mole content of manganese in the low-purity manganese-containing substance.

21. The method of claim 20, wherein the reductant includes an oxalate ($C_2O_4^{2-}$)-containing reagent, coke or sulfurous acid ($SO_2$) gas.

22. The method of claim 21, wherein the first impurity includes iron and potassium hydroxide is used as a 1 M solution to adjust acidity of the first manganese leachate to a pH of 5 or higher to remove the first impurity in the second manganese leachate-obtaining step.

23. The method of claim 22, wherein the sulfide includes sodium sulfide includes at least one selected from among sodium sulfide ($Na_2S$), calcium sulfide (CaS) and hydrogen sulfide ($H_2S$), and is added in an amount 10 to 50 times a total mole of the second impurity to remove the second impurity in the third manganese obtaining step.

24. The method of claim 23, wherein potassium hydroxide is added in such an amount as to adjust acidity of the third manganese leachate to a pH of 7 to 9 to produce manganese sulfate monohydrate.

25. The method of claim 24, further comprising adding sulfuric acid in an amount 0.5 to 1.5 times a mole content of manganese in the manganese oxide, adding an additional amount of the manganese oxide after the addition of sulfuric aid, and performing solid-liquid separation to give a fourth manganese leachate.

26. The method of claim 25, further comprising vaporizing the fourth manganese leachate in a vacuum to afford manganese sulfate monohydrate.

\* \* \* \* \*